June 2, 1964          J. T. McNANEY          3,135,868
LIGHT RESPONSIVE VOLTAGE MODULATING DEVICE
Filed Dec. 10, 1962
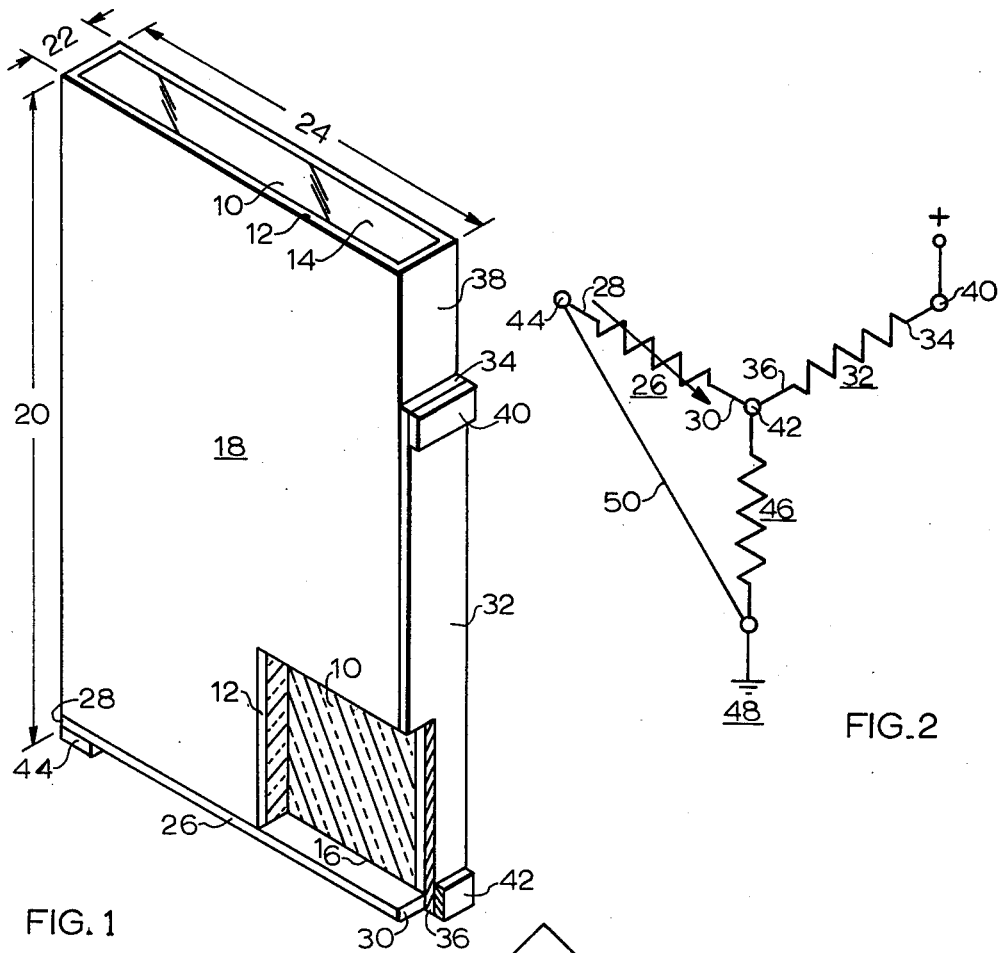
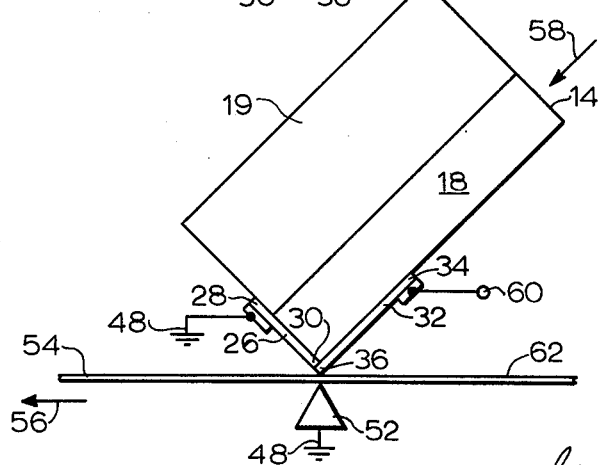
INVENTOR.
Joseph T. McNaney

United States Patent Office 3,135,868
Patented June 2, 1964

3,135,868
LIGHT RESPONSIVE VOLTAGE MODULATING
DEVICE
Joseph T. McNaney, 8548 Boulder Drive, La Mesa, Calif.
Filed Dec. 10, 1962, Ser. No. 243,506
12 Claims. (Cl. 250—227)

This invention relates to an improved light responsive voltage modulating device that may be used as a circuit means for deriving a modulated voltage or current as a function of light intensity, or, utilized in apparatus for transforming information presented in the form of radiant energy into modulations of electrical energy for recordation thereof.

The invention relates more particularly to improvements in light responsive voltage modulating means which include the use of a layer of photoconductor material supported by a light conductor having a predetermined index of refraction and a jacket of light reflector material having a relatively lower index of refraction for controlling the reflection of light through the light conductor and reflection of light to the photoconductor material. A change in the electrical resistance of the photoconductor under illuminated conditions will be used to decrease the influence of a voltage in the circuit associated therewith.

The improvement utilizes a light conductor-supported photoconductor in a Y connected circuit wherein the photoconductor will function as a "control element" in a first branch, with a "load resistor" in a second branch, and an "output impedance" in a third branch. The control element, load resistor and output impedance each have first and second terminals with the second terminal of each connected to one another as the three branches of the Y circuit.

Under operating conditions a primary source of voltage will be connected across the load resistor and the output impedance and a modifying influence will be connected to the control element. Upon the reflection of light through the light conductor to the photoconductor layer, or control element, the voltage appearing on the interconnected second terminals of the Y circuit will decrease as a function of the modifying influence and the intensity of the reflected light.

In addition to objects and advantages aforestated, it is an object of this invention to provide an improved light responsive voltage modulating device which is to cause a source of voltage to vary inversely as a function of light intensity.

It is another object of this invention to provide an improved recording apparatus wherein recordable information which is opaque, and therefore not light reflective, will be converted to record making voltage generating effects.

It is another object of this invention to provide a light responsive voltage modulator which is extremely small, simple to construction, positive in operation, and trouble-free in continued use.

Other objects and advantages will appear hereinafter as a description of the invention proceeds.

The novel features that are considered characteristic of this invention are set forth with particularity in the appended claims. The invention itself, both as to its organization and method of operation, as well as additional objects and advantages, will best be understood from the following description when read in connection with the accompanying drawing in which:

FIGURE 1 is a view in perspective, partially sectional, of a unitary device embodying the basic concepts of the invention;

FIGURE 2 is a schematic diagram of a Y connected circuit wherein the unitary device of FIGURE 1 comprises the first and second branches of the circuit in combination with an output impedance in the third branch; and FIGURE 3 is a diagrammatic presentation of a recorder circuit equivalent of the diagram in FIGURE 2.

Referring more particularly to the unitary device set forth in FIGURE 1, I have shown therein a light conductor 10, jacketed by a light reflector 12, extending from a first end 14 to a second end 16 of the light conductor 10. The light conductor 10 will be in the form of an optical fiber, such as flint glass, and having, as an example, an index of refraction of 1.80. The jacket or light reflector 12 may be of a crown glass and having, as an example, an index of refraction of 1.50, or, an index of refraction less than that of the fiber 10. In the process of fabricating such an assembly of materials, the fiber and the jacket are drawn together in order to provide an extremely important fire-polished, contamination-free, interface between the two different materials at and along the juncture. The fiber 10 and jacket 12 of the present device 18 of the invention has a longitudinal dimension exceeding its cross sectional dimension. The longitudinal dimension 20 may be, for example, as much as one inch or longer. The cross section is preferably longer in one direction than in the other giving it a width 22 of 0.001" and a length 24 of 0.010" to 0.100", as an example. The width dimension 22 is important insofar as the ability is concerned to place large numbers of the device 18 side-by-side in a minimum of space . The length 24 is utilized to support a longitudinally extending layer of photoconductor material 26 adjacent the second end surface 16.

The photoconductor layer 26 has a first terminal 28 and a second terminal 30 and is illustrated as having a longitudinal dimension about equal to the length 24 of the second end surface 16. The layer 26 of photoconductor material will be selected from a number of well known solids, such as selenium, cadmium sulphide, silicon, germanium, lead selenide, zinc sulfide, or combinations of such materials, either in their pure state or in a modified state. The invention is not to be limited in this respect since there is a large number of materials from which one or more photoconductors may be selected and utilized in this invention.

A layer 32 of electrical resistor material having a first terminal 34 and a second terminal 36 is disposed upon an outer surface 38 of the jacket 12 and thereby supported by the combined fiber 10 and jacket 12 assembly of the device 18. The second terminal 36 of the resistor layer 32 is operatively connected with the second terminal 30 of the photoconductor layer 26. The first terminal 34 is provided with an electrical conductor connector means 40 and the second terminal 36 is provided with an electrical conductor means 42. The first terminal 28 of the photoconductor layer 26 is provided with an electrical conductor connector means 44.

Referring now to FIGURE 2 in conjunction with FIGURE 1, the photoconductor layer 26 is symbolically shown as a control element 26 in the Y connected circuit and the resistor layer 32 is symbolically shown as a load resistor 32 in the circuit. An output impedance in the form of an electrical resistor 46 is connected between the electrical conductor 42 and a ground 48, or neutral position, in the circuit. A voltage will be connected between the first end terminal 34, or connector means 40, and the ground 48, allowing a potential influence to present itself at the interconnection point of the Y circuit or connector means 42. The first terminal 28 of the photoconductor layer through the connector means 44 is connected through a conductor 50 to the ground 48 of the circuit. Upon the admission of light through the first end 14 of the device 18 and the reflection of light to the photoconductor layer 26, a decrease in the electrical resistance of the layer 26 will result in a decrease in the potential influence at the interconnection point 42 of the circuit. The ground 48 connection to the connector means 44 will serve as the modifying influence in combination with the intensity of the light reflected to the layer 26, hence, decreasing the potential influence at the interconnection point 42 as a function of light input to the device 18.

A recorder circuit equivalent of the Y circuit of FIGURE 2 is shown in FIGURE 3, wherein, the photoconductor layer 26 will function as the control element 26 in a first branch; the resistor layer 32 as the load resistor 32 in a second branch; and an air gap, between the second terminal 36 of the resistor layer 32 and an electrode 52, as the output impedance 46 in a third branch. The first terminal 28 of the photoconductor layer 26 is connected to the ground 48, and the electrode 52 is connected to the ground 48.

In a recorder as illustrated in FIGURE 3, a plurality of devices 18, as described in connection with FIGURE 1, will be placed side-by-side adjacent a support means 19, utilizing the width dimension 22 to achieve a maximum recorder resolution capability. A record medium 54 is disposed within the air gap between the second terminal 36 and the electrode 52 and is capable of being moved in the direction of the arrow 56. The devices 18 will be arrayed, therefore, in a side-by-side manner extending from one side of the record medium to the other, or, at right-angle to the direction of travel of the record medium. Although the length 24 of the first end 14 is greater than desired, perhaps, for certain high density recorder requirements, an aperture mask may be used adjacent the first end 14 to limit the admission of light to an area not greater than 0.001″ x 0.001″. Light in the direction of the arrow 58 may be reflections from the surface of a sheet of data which is to be reproduced on the record medium 54. Through the use of an aperture mask, having an aperture therein 0.001″ wide and extending from one end of the array of devices 18 to the other, the invention will be capable of realizing high density information recording capabilities.

A source of voltage will be connected between an input terminal 60 and ground 48. The influence of this voltage will be extended from the first terminal 34 of the resistor layer 32 to the second terminal 36 and across the air gap, occupied by the record medium 54, to the electrode 52. As the record medium is moved in the direction of the arrow 56 the surface 62 will have established thereon a uniform electrostatic charge. In the absence of light incident to the first end 14 of the devices 18, or, as a matter of fact, if the photoconductor layer 26 were not even in the circuit, the resistor layers 32 in combination with the electrode 52 would be allowed to function as a conventional electrostatic generator. However, and by reason of the photoconductor 26, the highly selective electrostatic generator control function of the invention makes it possible to establish electrostatic charges on the record medium 54 in response to omissions of light. Herein, of course, will be found the most important advantage of the invention. In a data copying apparatus the record medium 54 will receive an electrostatic polarization corresponding to the data to be copied and not to the light background of the material on which it may have been printed.

It should, of course, be understood that many of the other embodiments embracing the general principles and constructions hereinbefore set forth may be utilized and still be within the ambit of the present invention.

The particular embodiments of the invention illustrated and described herein are illustrative only, and the invention includes such other modifications and equivalents as may readily appear to those skilled in the arts and within the scope of the appended claims.

I claim:

1. A light responsive voltage modulating means comprising:
   (a) a layer of photoconductive material presenting first and second terminals;
   (b) a layer of electrically resistive material presenting first and second terminals;
   (c) said second terminals respectively of said photoconductive material and said electrically resistive material being electrically connected with one another;
   (d) a light conductive core, having a predetermined index of refraction, including means for supporting said photoconductive material and said electrically resistive material so as to provide an apex adjacent to where said materials are connected and for conducting light to said photoconductive material; and
   (e) a light conductive jacket, having an index of refraction less than said predetermined index, disposed upon and intimately joined with said core for light insulating said core from said electrically resistive material intermediate said first terminal and said apex and controlling the reflection of light through said core and the reflection of light to said photoconductive material intermediate said first terminal and said apex.

2. A light responsive voltage modulating means comprising:
   (a) a layer of photoconductive material presenting first and second terminals;
   (b) a layer of electrically resistive material presenting first and second terminals;
   (c) said second terminals respectively of said photoconductive material and said electrically resistive material being electrically connected with one another;
   (d) a light conductive core, having a predetermined index of refraction, a longitudinal dimension exceeding its cross-sectional dimension, and first and second transverse ends;
   (e) a light conductive jacket, having an index of refraction less than said predetermined index, disposed upon and intimately joined with said core generally along said longitudinal dimension;
   (f) said photoconductive material disposed upon and intimately joined with said second transverse end;
   (g) said electrically resistive material being closely adjacent said second transverse end and optically isolated therefrom; and
   (h) said jacket being adapted to control the reflection of light from said first transverse end through said core and to said photoconductive material, and light insulate said core from said electrically resistive material.

3. The invention as set forth in claim 2 additionally including
   (i) an electrode adjacent said second terminals, spaced apart therefrom and defining a predetermined air gap therebetween.

4. The invention as set forth in claim 3 additionally including
   (j) means for connecting an electrical potential between said electrode and the first terminal of said electrically resistive material whereupon the influence of said potential will be extended across said air gap; and
   (k) said photoconductive material being adapted to control the influence of said potential across said air gap upon the reflection of light to said photoconductive material.

5. A light responsive voltage modulating means comprising:
   (a) a layer of photoconductive material presenting first and second terminals;
   (b) a layer of electrically resistive material presenting first and second terminals;
   (c) said second terminals respectively of said photoconductive material and said electrically resistive material being electrically connected with one another;
   (d) an output impedance comprising an air gap between an electrode and said second terminals;
   (e) a light conductive core, having a predetermined index of refraction, a longitudinal dimension exceeding its cross-sectional dimension, first and second ends, and including means for supporting said photoconductive material and said electrically resistive material adjacent said second end and for conducting light to said photoconductive material; and (f) a light conducting jacket, having an index of refraction less than said predetermined index, disposed upon said core along said longitudinal dimension for light insulating said core from said electrically resistive material and controlling the reflection of light through said core from said first end to said photoconductive material.

6. The invention as set forth in claim 5 additionally including (g) means for extending the influence of an electrical potential across said impedance and controlling the magnitude of said influence in response to the reflection of light from said jacket to said photoconductive material.

7. Means for utilization in a light responsive voltage control apparatus comprising:

(a) a layer of photoconductive material presenting first and second terminals;

(b) a layer of electrically conductive material having a predetermined electrical resistance between first and second terminals thereof;

(c) said second terminals of said respective layers being joined to provide an electrical juncture;

(d) a core of light conducting material, having a predetermined index of refraction, and a jacket of light conducting material, having an index of refraction less than said predetermined index, intimately joined to said core so as to provide a light conducting assembly having a light admitting surface and a light emitting surface; and (e) said layers being supported adjacent one end of said assembly so as to provide an apex substantially coincident with said juncture, and so that said jacket will light insulate said core from said electrically conductive material and reflect light entering said admitting surface to said photoconductive material through said light emitting surface.

8. The invention as set forth in claim 7 additionally including (f) an electrode adjacent said apex and a predetermined electrical impedance therebetween; and (g) means for connecting an electrical potential between said electrode and the first terminal of said electrically conductive material, whereby, the influence of said potential will be extended across said impedance and controlled as a function of said light reflections to said photoconductive material.

9. Means for utilization in a light responsive voltage control apparatus comprising:

(a) a layer of photoconductive material having first and second terminals;

(b) a layer of electrically conductive material having first and second terminals and a predetermined electrical resistance between said terminals;

(c) said second terminals of said respective layers being electrically connected with one another;

(d) a light conducting core, having a predetermined index of refraction, including means for supporting said respective layers so as to provide an apex adjacent to where said respective layers are connected with one another and for conducting light to said layer of photoconductive material;

(e) an output impedance comprising an air gap between an electrode and said apex;

(f) means for extending the influence of an electrical potential across said impedance;

(g) a light conductive jacket, having an index of refraction less than said predetermined index, disposed upon said core for light insulating said core from said layer of electrically conductive material intermediate the first terminal thereof and said apex, and for controlling the reflection of light to said layer of photoconductive material intermediate the first terminal thereof and said apex, thereby controlling the magnitude of said influence across said impedance.

10. A light responsive voltage modifying means comprising:

(a) a photoconductor presenting first and second terminals;

(b) an electrical resistor presenting first and second terminals;

(c) an output impedance presenting first and second terminals;

(d) said second terminals respectively of said photoconductor, said resistor and said impedance being electrically connected with one another and thereby comprising a Y connected circuit means;

(e) means for connecting a voltage between the first terminal of said resistor and the first terminal of said impedance and thereby extending the influence of said voltage across said impedance through said resistor;

(f) means for electrically coupling the first terminal of said photoconductor to the first terminal of said impedance and connecting a voltage modifying influence to the first terminal of said photoconductor; and (g) means for extending said voltage modifying influence to said second terminals through said photoconductor, thereby decreasing the magnitude of said voltage across said impedance, upon the exposure of light to said photoconductor.

11. The invention as set forth in claim 10 additionally including (h) said last stated means including optical light guide means through which said exposure of light will be conducted to said photoconductor.

12. The invention as set forth in claim 10 additionally including (h) said output impedance including an air gap between the first terminal thereof and said second terminals.

References Cited in the file of this patent

UNITED STATES PATENTS

| | | |
|---|---|---|
| 1,514,123 | Bacevicz | Nov. 4, 1924 |
| 2,898,468 | McNaney | Aug. 4, 1959 |
| 3,058,002 | Sihvonen | Oct. 9, 1962 |
| 3,085,159 | McNaney | Apr. 9, 1963 |
| 3,086,113 | McNaney | Apr. 16, 1963 |

OTHER REFERENCES

Fiber Optics and Their Application to Electronic Tubes, by R. L. Stow, Westinghouse Electric Corp., Electronic Tube Division, Elmira, N.Y., Sept. 27, 1960.